(12) United States Patent
Jayasena et al.

(10) Patent No.: US 11,847,048 B2
(45) Date of Patent: Dec. 19, 2023

(54) METHOD AND APPARATUS FOR PROVIDING PERSISTENCE TO REMOTE NON-VOLATILE MEMORY

(71) Applicant: Advanced Micro Devices, Inc., Santa Clara, CA (US)

(72) Inventors: Nuwan Jayasena, Santa Clara, CA (US); Shaizeen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/031,518

(22) Filed: Sep. 24, 2020

(65) Prior Publication Data

US 2022/0091974 A1   Mar. 24, 2022

(51) Int. Cl.
| *G06F 12/02* | (2006.01) |
| *G06F 12/0815* | (2016.01) |
| *G06F 15/173* | (2006.01) |
| *G06F 12/0868* | (2016.01) |
| *G06F 12/084* | (2016.01) |

(52) U.S. Cl.
CPC ........ *G06F 12/0238* (2013.01); *G06F 12/084* (2013.01); *G06F 12/0815* (2013.01); *G06F 12/0868* (2013.01); *G06F 15/17331* (2013.01)

(58) Field of Classification Search
None
See application file for complete search history.

(56) References Cited

U.S. PATENT DOCUMENTS

| 2005/0132250 | A1 | 6/2005 | Hansen et al. | |
|---|---|---|---|---|
| 2008/0177803 | A1 | 7/2008 | Fineberg et al. | |
| 2010/0100529 | A1 | 4/2010 | Erofeev | |
| 2011/0197016 | A1 | 8/2011 | Cong et al. | |
| 2014/0136786 | A1* | 5/2014 | Carpenter | G06F 9/466 711/125 |
| 2015/0006834 | A1* | 1/2015 | Dulloor | G06F 3/0659 711/162 |
| 2015/0178202 | A1* | 6/2015 | Sankaran | G06F 12/0815 711/122 |

(Continued)

FOREIGN PATENT DOCUMENTS

| KR | 10-2017-0039237 A | 4/2017 |
|---|---|---|
| KR | 1020170039237 A | 4/2017 |

*Primary Examiner* — Charles Rones
*Assistant Examiner* — Ryan Dare
(74) *Attorney, Agent, or Firm* — Volpe Koenig (57) ABSTRACT

A processing device and methods of controlling remote persistent writes are provided. Methods include receiving an instruction of a program to issue a persistent write to remote memory. The methods also include logging an entry in a local domain when the persistent write instruction is received and providing a first indication that the persistent write will be persisted to the remote memory. The methods also include executing the persistent write to the remote memory and providing a second indication that the persistent write to the remote memory is completed. The methods also include providing the first and second indications when it is determined not to execute the persistent write according to global ordering and providing the second indication without providing the first indication when it is determined to execute the persistent write to remote memory according to global ordering.

19 Claims, 4 Drawing Sheets

(56) References Cited

U.S. PATENT DOCUMENTS

| | | | |
|---|---|---|---|
| 2016/0092223 A1* | 3/2016 | Wang | G06F 9/30145 |
| | | | 712/208 |
| 2018/0137052 A1* | 5/2018 | Boyle | G06F 12/0804 |
| 2018/0239725 A1* | 8/2018 | Kumar | G06F 12/0897 |
| 2018/0357165 A1* | 12/2018 | Helmick | G06F 12/0246 |
| 2019/0102113 A1* | 4/2019 | Choudhury | G06F 16/2471 |

* cited by examiner

METHOD AND APPARATUS FOR PROVIDING PERSISTENCE TO REMOTE NON-VOLATILE MEMORY

BACKGROUND

Persistent memory is becoming an important area of memory system architecture. Persistent memory efficiently stores data structures such that they can continue to be accessed (e.g., via memory instructions or memory APIs) even after the end of the process that created or last modified the contents of memory locations. For example, persistent memory holds its contents even across power cycles such that if power is lost during execution of an application, the application can be resumed from where it left off when power was lost instead of having to restart the application.

Persistent memory can be directly accessed by the processor without stopping to do the block I/O as with conventional storage. By connecting persistent memory to the memory bus, a processor (e.g., CPU) can access the data directly without any driver or PCIe overhead and since memory is accessed, as an example, in 64 byte cache lines, the CPU reads only what it needs to read instead of rounding each access to a block size, as with conventional storage.

BRIEF DESCRIPTION OF THE DRAWINGS

A more detailed understanding can be had from the following description, given by way of example in conjunction with the accompanying drawings wherein.

DETAILED DESCRIPTION

A system's (e.g., processor and memory architecture) capability of reliably persisting data to memory typically requires primitives and instructions to guarantee persistence of the data. Conventional techniques achieve reliable hardware persistence capability via a combination of cache line flushes and memory fences. For example, some conventional techniques provide persistence by writing data, to be persisted, to a region of the physical address space that maps to non-volatile memory (NVM), evicting the data from caches using one or more cache line write back (CLWB) instructions, and issuing a memory fence by using a store fence (SFENCE) instruction to generate a memory fence.

The memory fence is used to prevent later write operations (also referred to herein as store operations) from completing until the memory fence has completed. Typically, NVM write bandwidth is significantly less than DRAM bandwidth, however, and NVM write latency is significantly higher than DRAM. As a result, the memory fence, which must wait for the preceding NVM memory write operations to complete, can take a long time to complete. Accordingly, non-trivial overhead is added by the memory fences.

This overhead is made worse when writing (also referred to herein as storing) to remote NVM (e.g., a shared pool of fabric-attached memory (FAM) or NVM attached to a remote node on a multi-node machine) because writing to remote NVM adds the latency of a round-trip traversal over a potentially large network and the bandwidth constraints of such a network, which can be highly loaded, to the critical path of the store fence completion. The store fence completion can, in turn, cause long stalls and reduced performance for a portion of an application or program (e.g., thread) issuing the persistent writes.

Some conventional techniques modify applications to not persist to remote NVM. These techniques are inefficient, however, because they constrain system design flexibility and reduce the value of FAM. In addition, each affected application must be modified to enforce persistence, resulting in redundant effort. Accordingly, conventional techniques are not able to reduce the significant performance overheads associated with fine-grain persistent writes (e.g., writes within a thread or work item) to remote NVM.

Features of the present disclosure include apparatuses and methods of controlling persistence writes of an execution program for multiple NVM pools with different performance characteristics. For example, features disclosed herein avoid global performance overheads (e.g., latency of a round-trip traversal over a potentially large network) for fine grain NVM use cases by utilizing local (local to processor issuing the persistent write) persistent memory to provide early confirmation, to the processor issuing the persistent write, that the persistent write to remote NVM will eventually persist to the intended remote persistent memory. Fine grain NVM use cases include cases in which dependent (i.e., dependent on the persistent writes) instructions of the program can continue to execute efficiently upon confirmation of completion of persistent writes or confirmation of ordering among persistence writes issued by the same sequence of instructions (e.g., thread or work item), the same core or the same processor.

In the examples described herein, the different performance characteristics include a local NVM with a higher performance (e.g., higher bandwidth and lower latency) than the remote NVM. Features of the present disclosure are implemented, however for devices having a variety of different performance characteristics, such as multiple locally-attached NVM pools with different performance characteristics, multiple fabric-attached NVM pools with different characteristics (e.g., due to distance to each over the network from the processor performing the operations), multiple remote nodes with NVM having different performance characteristics from other nodes (e.g., due to distance to each over the network from the processor performing the operations).

In some examples, a determination is made as to whether to use global ordering of persistent write operations across multiple sequences of instructions (e.g., threads or work items), multiple cores or multiple processors for a portion of the program (e.g., one or more remote persistent writes). When it is determined to use global ordering should, local persistent memory is not used for early confirmation of the one or more remote persistent writes. Otherwise, local persistent memory is used for early confirmation of remote persistent writes. The determination is made, for example, in response to a specific instruction or other annotation associated with one or more persistent writes. For example, when an issuing thread or work item includes an instruction for full completion of the persistent write (e.g., for synchronizing with other threads), local persistent memory is not used for early confirmation. Accordingly, the performance for fine grain use cases is improved (e.g., less latency) when no instruction for full completion of the persistent write is included and global ordering is also facilitated when an issuing thread or work item includes an instruction for full completion of the persistent write.

Features of the present disclosure include providing two separate indications for a persistent write. For example, when a persistent write to remote memory is issued (e.g., by a processor core of a processor executing the thread or work item), an entry is logged, via the processor, in a local persistence domain (e.g., local persistent memory, such as local NVM or the memory controller of the local NVM if the memory controller is within a persistence domain). When the entry is logged, a first indication (e.g., early persist completion (EPC) indication) is provided (e.g., by the processor to the processor core) that the persistent write will eventually be persisted to the intended remote persistent memory (e.g., remote NVM). When the persistent write is completed to the remote persistent memory, a full persistence completion (FPC) is provided (e.g., by the processor to the processor core).

A method of controlling remote persistent writes is provided. The method comprises receiving an instruction to issue a persistent write to remote memory and logging an entry in a local domain when the persistent write instruction is received. The method also comprises providing a first indication that the persistent write will be persisted to the remote memory and executing the persistent write to the remote memory.

A method of controlling remote persistent writes is provided. The method comprises receiving an instruction to issue a persistent write to remote memory. When it is determined not to execute the persistent write to remote memory according to global ordering. The method also comprises, when it is determined not to execute the persistent write according to global ordering, logging an entry in a local domain when the persistent write instruction is received, providing a first indication that the persistent write will be persisted to the remote memory and executing the persistent write to the remote memory.

A processing device is provided which comprises local memory, remote memory and a processor. The processor is configured to receive an instruction to issue a persistent write to the remote memory and log an entry in the local memory when the persistent write instruction is received. The processor is also configured to provide a first indication that the persistent write will be persisted to the remote memory and execute the persistent write to the remote memory.

Figure 1:
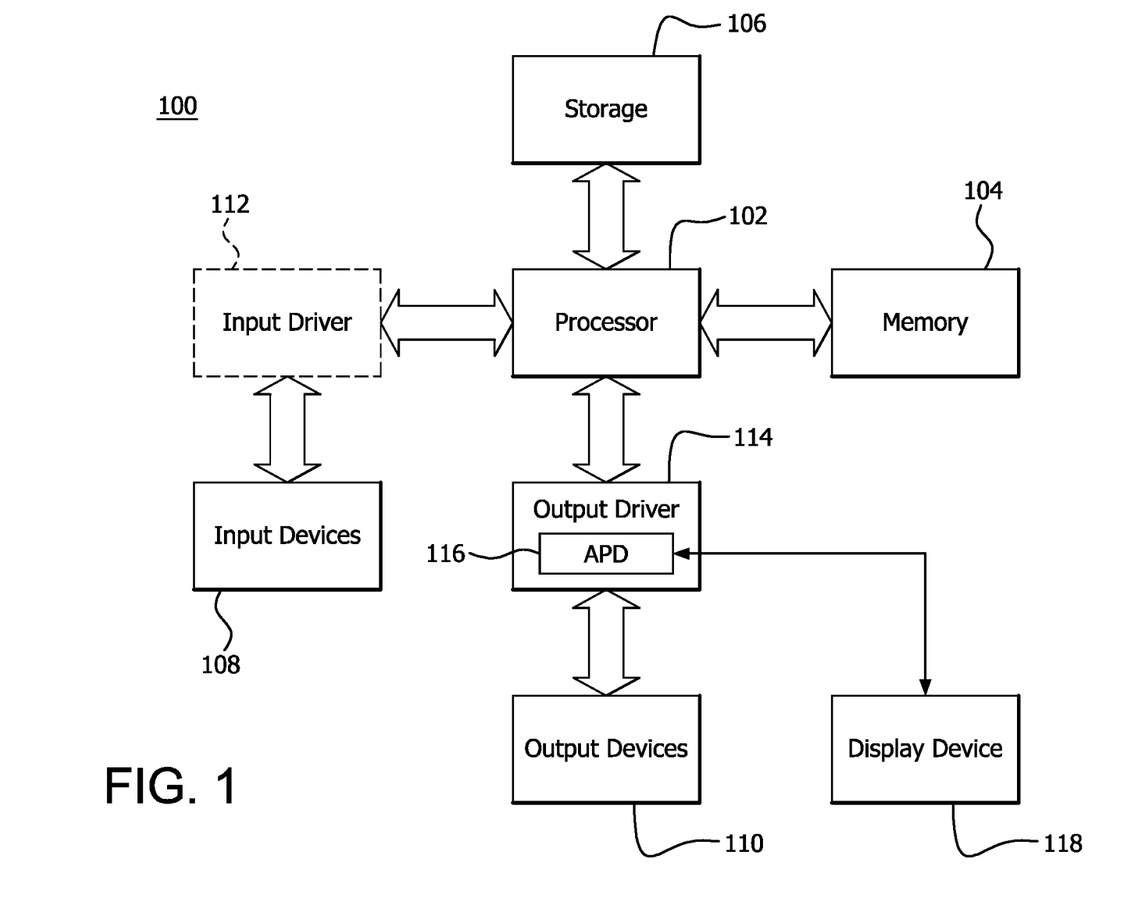
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
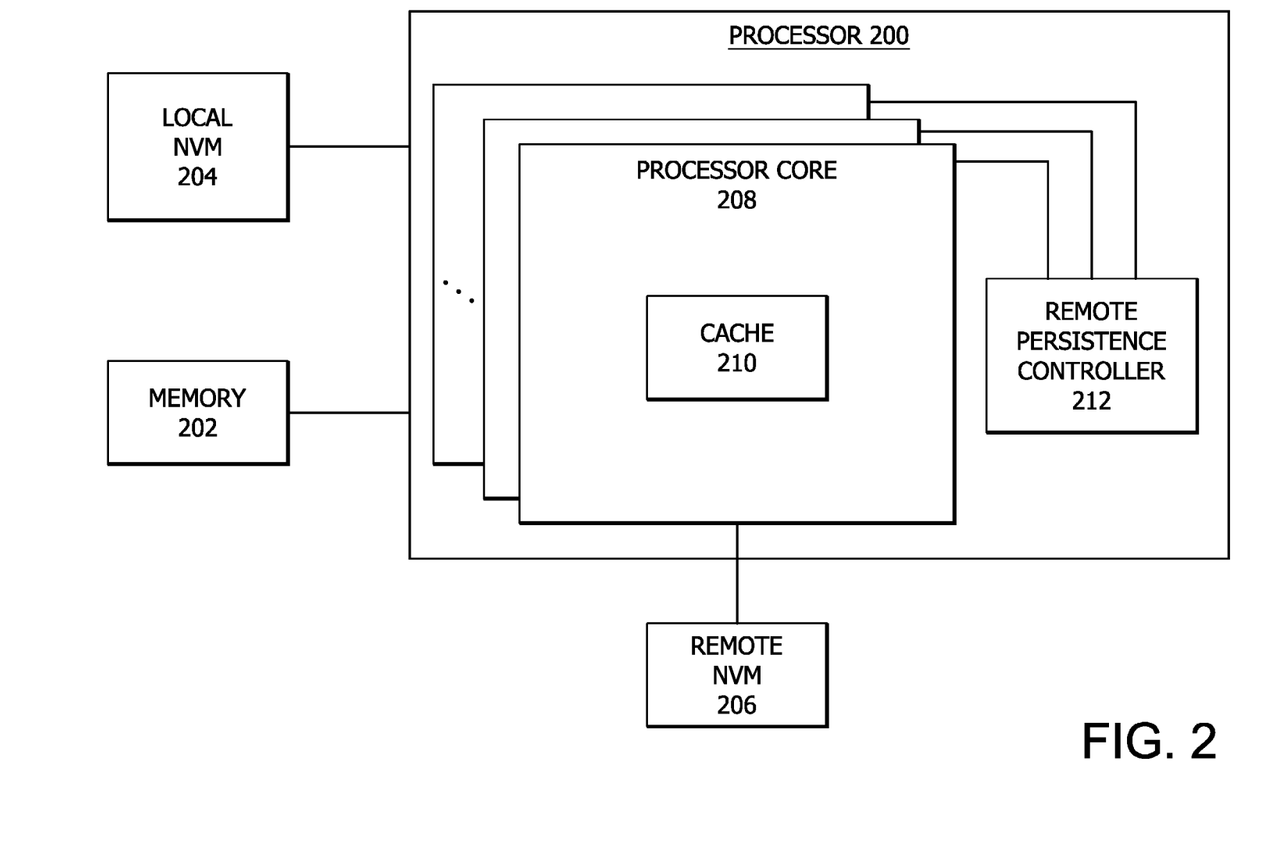
FIG. 2 is a block diagram illustrating example components for implementing one or more features of the disclosure.

FIG. 2 is a block diagram illustrating example components of a processing device for implementing one or more features of the disclosure. Some components shown in FIG. 2 are, for example, components of a processor, such as an accelerated processor (e.g., GPU). Features of the disclosure can be executed by one or more processors of a first type, such as a CPU, and/or one or more processors of a second type, such as a GPU.

As shown in FIG. 2, components of the processing device include processor 200, memory (e.g., main memory) 202, local NVM 204 and remote NVM 206.

The processor 200 is, for example, a CPU or an accelerated processor, such as a GPU. Processor 200 includes a plurality of processor cores 208. Each processor core 208 can include a dedicated cache 210. Alternatively, a cache 210 can be shared by a plurality of processor cores 208.

The processor 200 also includes a remote persistence controller 212 in communication with each processor core 202. The remote persistence controller 206 is configured to receive (e.g., from processor cores 208) instructions to issue persistent writes, log entries in a local persistence domain (e.g., local NVM 204) when the persistent write instructions are received, provide first indications (e.g., early persist completion (EPC) indications) to the processor cores 208 that the persistent writes will be persisted to the intended remote persistent memory (e.g., remote NVM 206), execute writes to the remote persistent memory and provide second indications (e.g., full persist completion (FPC) indications) to the processor cores 208 indicating completion of the persistent writes to the remote persistent memory. The remote persistence controller 206 is, for example, implemented in hardware, firmware, software (e.g., executing on one or more processor cores 208) or a combination thereof.

The local NVM is, for example, able to execute portions of the program more efficiently (e.g., higher bandwidth, lower latency, both higher bandwidth and lower latency, or other performance characteristics) than the remote NVM.

Figure 3:
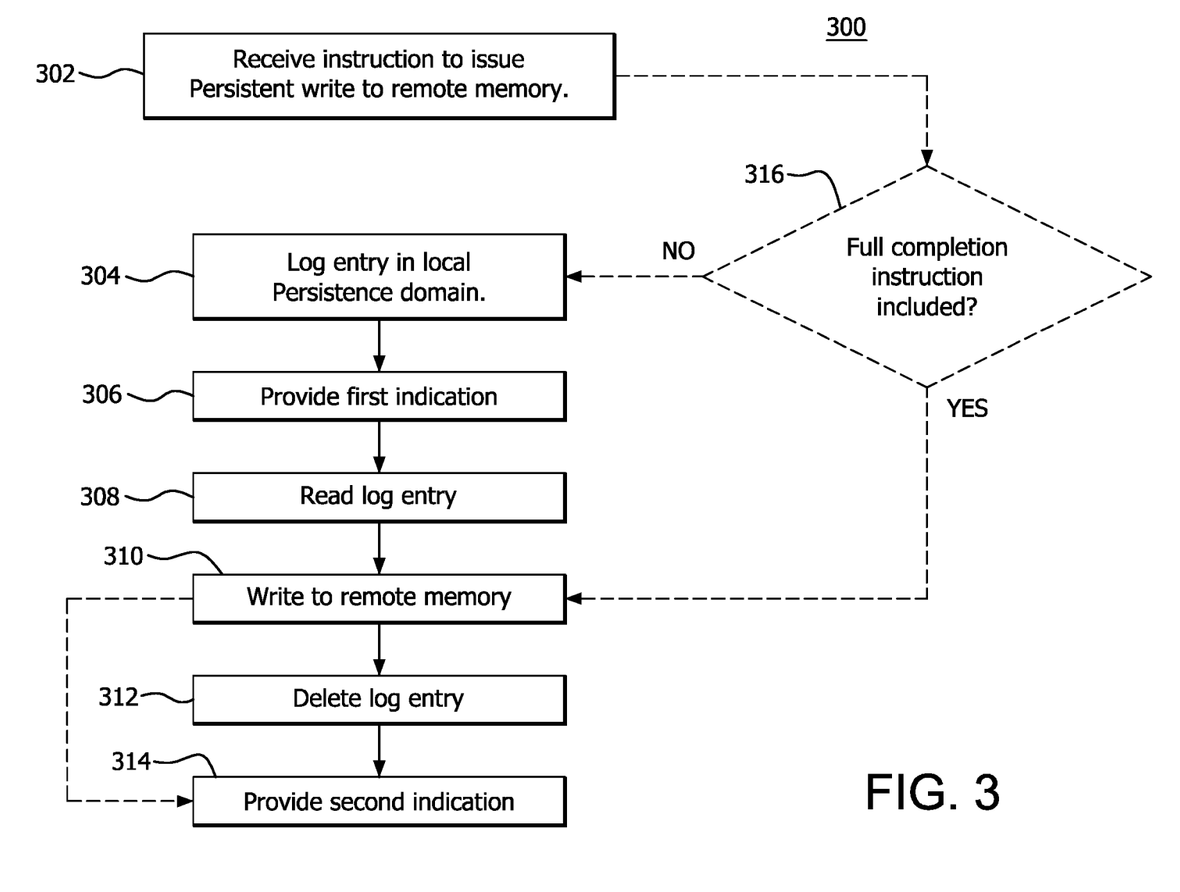
FIG. 3 is a flow diagram illustrating an example method of controlling persistent writes to remote persistent memory according to features of the disclosure.

FIG. 3 is a flow diagram illustrating an example method 300 of controlling persistent writes to remote memory.

As shown at block 302 in FIG. 3, the method 300 includes receiving an instruction to issue a persistent write to remote memory. For example, an instruction to issue a persistent write (e.g., write data) to remote memory (e.g., to address of remote NVM 206) is provided by a processor core (e.g., processor core 208) executing a program and is received by the processor 200 (e.g., received by remote persistence controller 212 of processor 200).

As shown at block 304 in FIG. 3, the method 300 includes logging an entry in a local persistence domain when the persistent write instruction is received. For example, when the instruction to issue the persistent write to remote memory is received, the processor (e.g., remote persistence controller 212 of processor 200) logs an entry in a local persistence domain (e.g., local NVM 204 or a memory controller (not shown) of the local NVM 204).

The log is different from application-level logs (e.g., application-level logs for failure recovery) and is not made visible to the executing application/program. The log is used exclusively by the system software, firmware, or hardware to temporarily stage the persistent writes to remote persistence memory in local memory, such as a local NVM, which is faster (e.g., higher bandwidth and/or less latency) than a remote NVM. A portion of the local NVM 204 is, for example, reserved (e.g., prior to or during run time) for the log entries, via hardware, firmware (e.g., BIOS), or software.

As shown at block 306 in FIG. 3, the method 300 includes providing a first indication to the processor core 208, which provided the instruction to issue the persistent write, that the persistent write will be persisted to the remote persistent memory. For example, after the entry is logged in the local persistence domain, the processor (e.g., remote persistence controller 212 of processor 200) provides an early persist completion (EPC) indication to the processor cores 208 that the persistent write will be persisted to the remote persistent memory (e.g., remote NVM 206).

After the EPC is generated, pending remote NVM writes are trickled out from the local reserved NVM region to the intended remote NVM locations in the background. This trickling is performed in the order that the pending remote NVM writes were placed in the corresponding log.

As shown at blocks 308 and 310 in FIG. 3, the method 300 includes reading the log entry from the local persistence domain and executing the persistent write to the remote persistent memory. For example, the processor (e.g., remote persistence controller 212 of processor 200) trickles out the persistent write by reading the log entry from the local persistence domain (e.g., local NMV 204) writing the data to the intended address of the remote persistent memory (e.g., local NMV 206).

As shown at blocks 312 and 314 in FIG. 3, the method 300 includes deleting the log entry from the log in the local persistence memory and providing a second indication that the persistent write to the remote persistent memory is completed. For example, the processor (e.g., remote persistence controller 212 of processor 200) deletes the log entry from the log in the local persistence domain (e.g., local NVM 204) and provides a second indication (e.g., full persist completion (FPC) indications) to the processor core 208 that the persistent write to the remote persistent memory (e.g., remote NVM 206) is completed.

In the example shown in FIG. 3, the first indication (e.g., EPC indication) is generated prior to the second indication (e.g., FPC indication). In other alternative examples, the first indication and the second indication are generated simultaneously.

In some examples, a persistent write to remote memory is performed without providing the first indication (e.g., early confirmation). For example, a determination is made as to whether to use global ordering for executing a portion of the program (e.g., one or more persistent writes). When it is determined to use global ordering, local persistent memory is not used for early confirmation of the one or more remote persistent writes and the first indication is not provided. When it is not determined to use global ordering (e.g., for portions of a program in which later issued write (store) operations are permitted to complete upon confirmation that the prior persistent writes will eventually complete or upon confirmation of an intended ordering among persistence operations issued by the same thread, core or processor), the local persistent memory is used for early confirmation of the one or more remote persistent writes and both the first indication and second indication are provided The determination is made, for example, in response to a specific instruction (e.g., programmed instruction or annotation associated with one or more persistent writes), such as, for example, when instructions to issue the one or more persistent writes also include a request for confirmation of the full persistence completion without request for confirmation of early persist completion.

An example of this determination, made in response to a specific instruction, is shown in phantom (i.e., dashed lines) in FIG. 3. As shown, a determination is made, at decision block 316, as to whether an instruction to issue a persistent write includes an instruction request for full completion of the persistent write. When it is determined, at decision block 316, that an instruction for full completion is included, the method proceeds to block 310 and local persistent memory is not used for early confirmation. When it is determined, at decision block 316, that an instruction for full completion is not included, the method proceeds to block 304 and local persistent memory is used for early confirmation. Accordingly, the performance for fine grain use cases is improved (e.g., less latency) when no instruction for full completion of the persistent write is included and global ordering is also facilitated when an issuing thread or work item includes an instruction for full completion of the persistent write.

While the example described above includes making a determination, as to whether global ordering should be used, after receiving an instruction to issue a persistent write, examples also include making the determination prior to receiving the instruction to issue the persistent write.

Events such as thread migration from one core to another core, or process completion of a portion of a program (e.g., a thread of execution) are delayed until any remote persistent writes pending in the local persistence domain log and belonging to the corresponding threads, cores and/or processes are completed to their final destinations.

In the example described above in FIG. 3, an issuing core (e.g., 208) considers the persistent write completed when the first indication (e.g., the EPC indication) or the second indication (e.g., FPC indication) is received. Accordingly, an early persistence memory fence (EPFENCE) is provided, which considers a persistent write complete when the first indication or the second indication is received. That is, a program need not wait for an FPC for fine grain NVM use cases in which instructions of the program can continue to execute efficiently upon confirmation of completion of persistent writes or confirmation of ordering among persistence writes issued by the same sequence of instructions (e.g., thread or work item), the same core or the same processor.

Therefore, a thread issuing an EPFENCE primitive can continue execution of dependent instructions when EPCs corresponding to outstanding persistent writes are received. To ensure subsequent reads to remote NVM to receive the latest data, the reads to the remote NVM check for any writes to the same remote address pending in the local reserved NVM region for staging remote writes. This check can be accelerated via a tracking structure stored in volatile memory (e.g., SRAM, DRAM) as this tracking structure need not be persistent.

In some examples, persistence completion is used for synchronizing with other threads which can be executing on other processors, such as when persistent writes across multiple threads are explicitly ordered. In these examples, a full persistence fence (FPFENCE) is used, which causes the program to wait for the second indication (e.g., FPC indication), confirming persistence completion of the remote NVM writes to their eventual destination, before executing other operations. The FPFENCE facilitates ordering of remote persistent writes being trickled out from multiple processors which would otherwise not be ordered correctly because the logs in local NVM are independent. The FPFENCE also avoids overhead costs of other threads, running on other processors, checking the pending remote writes in the local NVM of each processor.

In some examples, when the EPFENCE completes, a book-keeping (e.g., software-level operations of updating of application-level persistence metadata such as application-level logs) is performed before completion of FPFENCE, which effectively overlaps application-level book-keeping tasks with remote NVM write latency.

Figure 4:
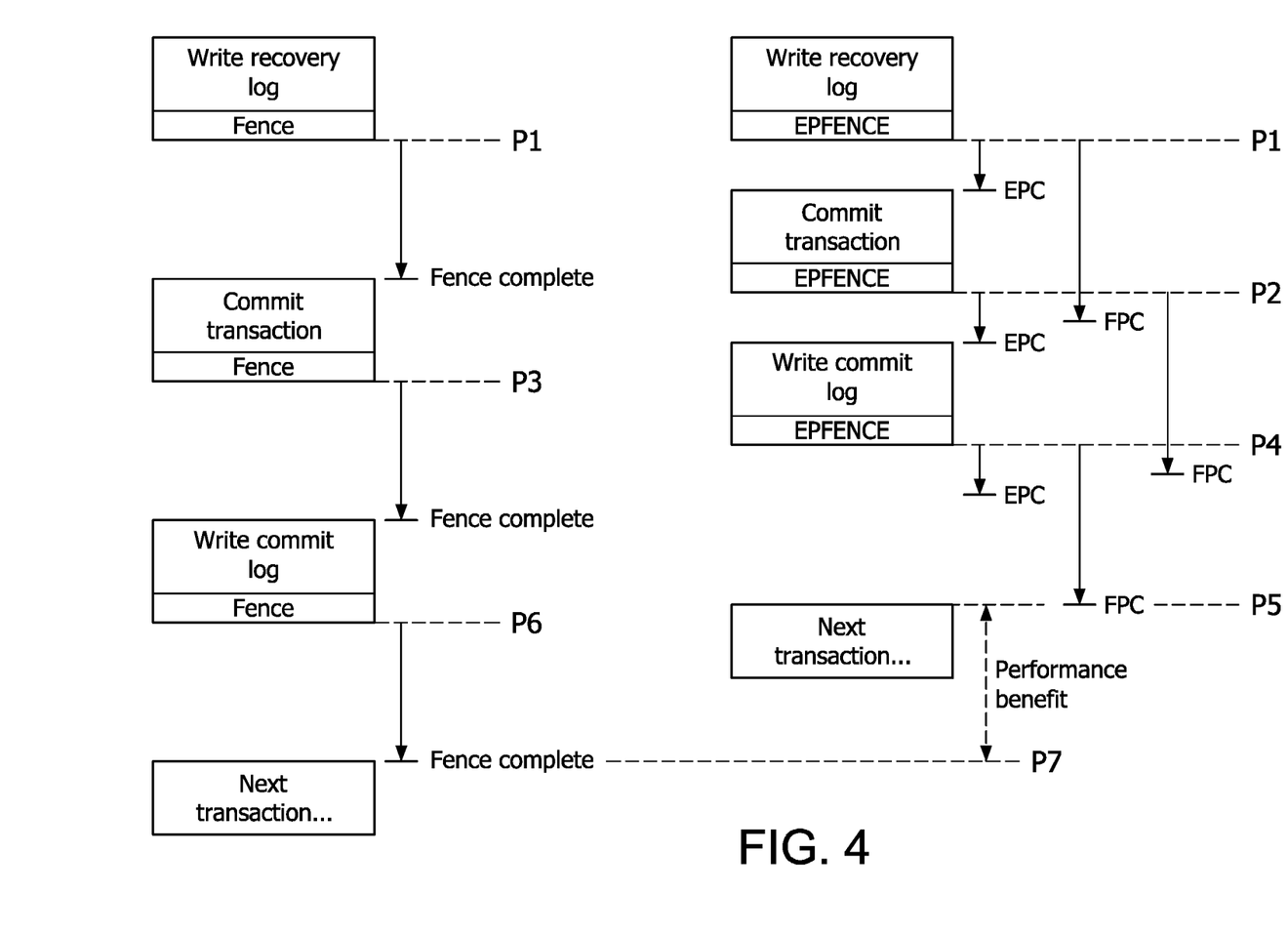
FIG. 4 is a diagram illustrating performance benefits of an example method of utilizing an early persistence fence and a full persistence fence for persistence ordering operations according to features of the disclosure.

FIG. 4 is a diagram illustrating the performance benefits of an example method of utilizing both an EPFENCE and an FPFENCE for persistence ordering operations according to features of the disclosure. FIG. 4 illustrates these performance benefits in comparison to using an FPFENCE without an EPFENCE for each of the persistence ordering operations. The left side of FIG. 4 illustrates a process in which FPFENCE is used for each of the persistence ordering operations. The right side of FIG. 4 illustrates a process in which EPFENCE is used for the first and second persistence ordering operation and a single FPFENCE is used for the third persistence ordering operation.

As shown in the process on the left side of FIG. 4, three separate ordering operations (indicated by vertical arrows), used for facilitating global ordering, are performed serially (e.g., over time or clock cycles) at three ordering points P1, P3 and P6 of the persistent write (i.e., persistent write transaction). The latency cost associated with an ordering operation for facilitating global ordering, is incurred at each of the three points P1, P3 and P6. That is, before the next persistent write is permitted at point P7, a first latency cost associated with a global ordering operation is incurred after completing the recovery log from point P1 to fence complete, a second latency cost associated with a global ordering operation is incurred after completing the transaction commit from P3 to fence complete and a third latency cost associated with a global ordering operation is incurred after completing the log update commit from P6 to fence complete. Accordingly, when the process shown on the left side of FIG. 4 is performed, the next transaction can then start at point P7.

As shown on the right side of FIG. 4, fine grain persistence ordering (e.g., ordering within a thread's operations) is performed at two intermediate points P1 (i.e., after completing the recovery log) and P2 (after completing the transaction commit) and a global ordering operation is performed once at a point (P4) after completion of the final stage (i.e., write commit log).

That is, a first latency cost associated with a fine grain ordering operation is incurred after completing the recovery log from point P1 to the first EPC. Because the latency cost associated with a fine grain ordering operation is less than the latency cost associated with a global ordering operation (shown on the left side of FIG. 4), the commit transaction on the right side of FIG. 4 starts and ends (at P2) earlier than the commit transaction ends (P3) on the left side of FIG. 4. A second latency cost associated with a fine grain ordering operation is then incurred after completing the commit transaction from point P2 to the second EPC. Again, because the latency cost associated with a fine grain ordering operation is less than the latency cost associated with a global ordering operation (shown on the left side of FIG. 4), the write commit log on the right side of FIG. 4 ends (at P4) significantly earlier than the write commit log ends (P6) on the left side of FIG. 4.

After completing the write commit log on the right side of FIG. 4, the next transaction starts after the latency cost associated with a global ordering operation is incurred at point P5 from point P4 to the FPC at P5.

Because the program waits less for early confirmation at the first 2 points, the process shown on the right side incurs less latency cost for each of the first two ordering operations than the process on the left side of FIG. 4. Accordingly, the right side of FIG. 4 shows the performance benefit and overall latency reduction (i.e., difference between points P7 and P5).

As described above, a region of local NVM is reserved where the log entries of writes to remote memory are stored. In examples in which the reserved space is full, requests (e.g., by a processor) to issue subsequent persistent writes can be delayed until sufficient space is freed up via trickling out currently stored writes to remote memory. Alternatively, some examples allow the size of the local reserved region to be changed (e.g., increased if more space is needed or reduced if space is underutilized).

Memory wear is mitigated, for example, by periodically moving the reserved region of local NVM to another part of local NVM, thereby spreading out the frequent writes over all of memory over a period of time. Additionally or alternatively, the local NVM is a higher-cost solution such as DRAM with a backup power source that can retain data for a desired length of time (e.g., until a backup power source for the system can be deployed or the data stored there can be extracted and persisted via other means). Additionally or alternatively, remote persistent writes are buffered in queues that are within a persistent domain. That is, sufficient battery power is provisioned to drain their contents to a non-volatile memory in case of power failure. These queues will then have to store additional metadata to complete the remote writes and issue appropriate events (e.g. EPC).

Features of the present disclosure are useful for events such as a power failure or other catastrophic event in which the processing device shuts down with pending remote writes in local reserved NVM regions. Upon subsequent power-up, the pending persistent writes are completed to their final destinations before any user software is allowed to execute.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, processor core 208, and the remote persistence controller 212) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of controlling remote persistent writes comprising:
receiving, by a processor comprising a plurality of processor cores, an instruction from one of the processor cores to issue a persistent write to remote memory;
when the persistent write is not executed according to global ordering:
logging an entry in a local domain, comprising a first portion of non-volatile memory local to the processor, when the persistent write instruction is received;
providing, to the one processor core, a first indication that the persistent write will be persisted to the remote memory when the entry is logged in the local domain and a second indication that the persistent write to the remote memory is completed; and
executing the persistent write to the remote memory; and
when the persistent write to remote memory is executed according to global ordering, executing the persistent write to the remote memory and providing the second indication without providing the first indication.

2. The method of claim 1, further comprising:
reading the entry from the local domain; and
deleting the entry from the local domain.

3. The method of claim 1, further comprising:
providing the first indication that the persistent write will be persisted to the remote memory and executing the persistent write to the remote memory when the instruction does not request confirmation that the persistent write is completed; and
providing a second indication that the persistent write to the remote memory is completed and executing the persistent write when the instruction requests confirmation that the persistent write is completed.

4. The method of claim 3, wherein the instruction to issue the persistent write is received from a processor core and the first indication and the second indication is provided to the processor core.

5. The method of claim 3, further comprising:
when it is determined to execute the persistent write to the remote memory according to global ordering, executing the persistent write to the remote memory without logging the entry in the local domain.

6. The method of claim 3, further comprising:
determining whether the instruction to issue the persistent write requests confirmation that the persistent write is completed without requesting confirmation that the persistent write will be persisted to the remote memory; and
when it is determined that the instruction requests confirmation that the persistent write is completed without requesting confirmation that the persistent write will be persisted to the remote memory, executing the persistent write to the remote memory and providing the second indication without logging the entry in the local domain and without providing the first indication.

7. The method of claim 3, further comprising:
providing an early persistence memory fence in which the persistent write is determined to be completed when one of the first indication and the second indication is provided; and
executing subsequent instructions when one of the first indication and the second indication is provided.

8. The method of claim 3, further comprising:
providing a full persistence memory fence in which the persistent write is determined to be completed when the second indication is provided; and
executing subsequent instructions when the second indication is provided.

9. The method of claim 1, wherein the remote memory is a second portion of non-volatile memory and the first portion of non-volatile memory is closer to a processor issuing the persistent write than the second portion of non-volatile memory.

10. A method of controlling remote persistent writes comprising;

receiving, by a processor comprising a plurality of processor cores, an instruction from one of the processor cores to issue a persistent write to remote memory;

when it is determined not to execute the persistent write according to global ordering:

logging an entry in a local domain, comprising a first portion of non-volatile memory local to the processor, when the instruction to issue the persistent write is received;

providing, to the one processor core, a first indication that the persistent write will be persisted to the remote memory when the entry is logged in the local domain and a second indication that the persistent write to the remote memory is completed; and executing the persistent write to the remote memory; and when it is determined to execute the persistent write to remote memory according to global ordering, executing the persistent write to the remote memory without logging the entry in the local domain.

11. The method of claim 10, further comprising:

determining, by the processor, whether or not to execute the persistent write to remote memory according to global ordering when it is determined to execute the persistent write to remote memory according to global ordering, executing the persistent write to the remote memory and providing the second indication without providing the first indication.

12. The method of claim 11, wherein determining whether or not to execute the persistent write to remote memory according to global ordering comprises determining whether the instruction to issue the persistent write includes an instruction for confirmation of full completion of the persistent write without including an instruction for confirmation that the persistent write will be persisted to the remote memory, when it is determined that the instruction includes the instruction for confirmation of full completion of the persistent write and the instruction for confirmation that the persistent write will be persisted to the remote memory:

logging the entry in the local domain when the persistent write instruction is received;

providing the first indication that the persistent write will be persisted to the remote memory;

executing the persistent write to the remote memory; and providing the second indication that the persistent write to the remote memory is completed; and when it is determined that the instruction includes the instruction for confirmation of full completion of the persistent write without the instruction for confirmation that the persistent write will be persisted to the remote memory, executing the persistent write to the remote memory and providing the second indication without logging the entry in the local domain and without providing the first indication.

13. The method of claim 11, wherein when it is determined not to execute the persistent write to remote memory according to global ordering, the method further comprises:

providing an early persistence memory fence in which the persistent write is determined to be completed when one of the first indication and the second indication is provided; and executing subsequent instructions when one of the first indication and the second indication is provided.

14. The method of claim 11, wherein when it is determined to execute the persistent write to remote memory according to global ordering, the method further comprises:

providing a full persistence fence in which the persistent write is determined to be completed when the second indication is provided; and executing subsequent instructions when the second indication is provided.

15. A processing device comprising:

local non-volatile memory;

remote memory; and a processor, comprising a plurality of processor cores, configured to:

receive an instruction from one of the processor cores to issue a persistent write to the remote memory;

when the persistent write is not executed according to global ordering:

log an entry in the local non-volatile memory when the persistent write instruction is received;

provide, to the one processor core, a first indication that the persistent write will be persisted to the remote memory when the entry is logged in the local non-volatile memory local to the processor and a second indication that the persistent write to the remote memory is completed; and execute the persistent write to the remote memory; and when the persistent write to remote memory is executed according to global ordering, execute the persistent write to the remote memory and provide the second indication without providing the first indication.

16. The processing device of claim 15, wherein the local non-volatile memory is a first portion of non-volatile memory, the remote memory is a second portion of non-volatile memory and the first portion of non-volatile memory is closer to the processor than the second portion of non-volatile memory.

17. The processing device of claim 15, wherein the processor comprises a plurality of processor cores, the instruction to issue the persistent write is received from the one processor core, the processor is configured to:

provide the first indication to the one processor core, and provide a second indication to the one processor core that the persistent write to the remote memory is completed.

18. The processing device of claim 17, wherein the processor is configured to:

when it is determined to execute the persistent write to the remote memory according to global ordering, execute the persistent write to the remote memory and provide the second indication without providing the first indication.

19. The processing device of claim 17, wherein the processor is further configured to:

provide an early persistence memory fence in which the persistent write is determined to be completed when one of the first indication and the second indication is provided; and execute subsequent instructions when one of the first indication and the second indication is provided.

\* \* \* \* \*